United States Patent [19]

Vinczer et al.

[11] Patent Number: 4,873,412

[45] Date of Patent: Oct. 10, 1989

[54] AUTOMATIC FEED APPARATUS, FOR FUSION WELDING MACHINE, AND ELECTRODE HOLDER THEREFOR

[76] Inventors: Peter S. Vinczer, 1 Parkington Crescent, Scarborough, Ontario, Canada, M1H 2T6; Ferenc B. Vinczer, 2 Lynch Rd., Willowdale, Ontario, Canada, M2J 2V5

[21] Appl. No.: 943,114

[22] Filed: Dec. 18, 1986

[51] Int. Cl.[4] .............................................. B23K 9/22
[52] U.S. Cl. ..................................... 219/95; 219/136; 219/138
[58] Field of Search ..................... 219/136, 95, 96, 98, 219/99, 138, 78.01

[56] References Cited

U.S. PATENT DOCUMENTS

| | | | |
|---|---|---|---|
| 2,966,577 | 12/1960 | Welch | 219/136 |
| 3,339,799 | 9/1967 | Spisak | 219/98 |
| 3,825,719 | 7/1974 | Jonsson | 219/136 |

Primary Examiner—Clifford C. Shaw
Attorney, Agent, or Firm—Rogers, Bereskin & Parr

[57] ABSTRACT

An automatic feed apparatus is provided for a fusion welding machine, in which metal components are welded together. The apparatus has an electrode holder for holding a pin and having a clamping lever for clamping the pin to an electrode. A feeding device feeds pins to the electrode holder. A feed control unit controls the feeding device so that pins are sent individually to the electrode holder. The electrode holder in turn is controlled by a holder control unit. The holder control unit causes the clamping lever to open to receive a pin, and optionally can also control the position at which the pin is clamped. The feed control unit and holder control unit are synchronized together. Thus, the feeding device is only actuated to send a pin to the electrode holder, when the holder control unit has opened the clamping lever. After a predetermined time, sufficient for a pin to travel to the electrode holder, actuation of the feeding device is terminated and the electrode holder is released by the holder control unit. The clamping lever then holds a pin in the electrode holder, ready for a welding operation.

20 Claims, 10 Drawing Sheets

AUTOMATIC FEED APPARATUS, FOR FUSION WELDING MACHINE, AND ELECTRODE HOLDER THEREFOR

FIELD OF THE INVENTION

This invention relates to fusion welding. This invention more particularly relates to an automatic feed apparatus, for use with a fusion welding machine.

BACKGROUND OF THE INVENTION

Presently, fusion welding is a widely used technique for welding together small, metal components. Fusion welding is achieved by bringing two components together. One of the components is formed with a small nib or projection, which contacts the other. This creates a small, spot contact having a relatively high resistance. An electric charge from a bank of capacitors is then discharged between the two components. The energy of the electric charge is dissipated at the point contact, resulting in local melting of the two metals. The melted zones fuse together, to weld the two components together. The welding is extremely quick and only causes heating and melting of small areas of each component. Consequently, by careful control of the electric charge and other operating conditions, relatively small components can be welded together.

Commonly, fusion welding is used to mount a variety of studs or posts in position, which may have plain shafts, threaded shafts or shafts of a special configuration. It is also used to weld jewelry components together. One particular application involves the welding of posts or studs for earrings to small plates that hold the ornamental part of the earring.

In such an application, and in many similar applications, the post or pin is relatively small and difficult to handle. Further, it is desirable that these components be produced at a relatively high speed, in large quantities. However, if each of the two components has to be manually inserted into the fusion welding machine, then the operation is of necessity relatively slow. It is desirable that the operation should be automated as much as possible.

Proposals have been made for automating the feed of the pins or posts to a fusion welding machine, more particularly the supply of small pins for jewellery and the like. However, earlier proposals have not been entirely satisfactory, and tend to suffer from a number of disadvantages.

In one known automatic machine, pins are fed by an air flow through a flexible tube. This tube is connected to a rigid tube running through a piston rod of the drive cylinder. Since the flexible tube does not extend right down to the electrode holder at the bottom of the drive cylinder, difficulties occur with the feed of the pins through the rigid tube. Frequently, the pins become jammed, with two or more pins becoming wedged side by side.

The actual electrode holder itself is a power-operated electrode holder and has a moveable jaw that is operated by an air piston and cylinder assembly. This drives the moveable jaw against a fixed jaw, to hold a pin in position.

Experience with such a device suggests that it is unreliable. Jamming of the pins or posts in the feed path is a frequent occurrence.

SUMMARY OF THE PRESENT INVENTION

In accordance with the present invention, there is provided an automatic feed apparatus, for a fusion welding machine, the automatic feed apparatus comprising:

an electrode holder, adapted for mounting on a driver cylinder of a fusion welding machine for holding a pin for fusion welding to a base piece, the electrode holder including a clamping means for clamping a pin;

a holder control unit, which is mounted for opening the clamping means of the electrode holder;

a feeding device for feeding pins to the electrode holder; and a feed control unit, which is connected to the feeding device and to the holder control unit, operation of the holder control unit and feed control unit being synchronized, so that the feed control unit only actuates the feeding device to feed a pin to the electrode holder when the holder control unit has opened the electrode holder, and after a predetermined time, the feed control unit terminates actuation of the feeding device and the holder control unit releases the clamping means, thereby clamping a pin.

The clamping means can be a lever acted upon by a spring. The holder control unit then has a movable head which abuts the lever, to displace it against the action of the spring, to enable a pin to be delivered. The movable head can be driven by a horizontal, pneumatic cylinder.

The feed control unit can comprise an injection piston and cylinder assembly, which drives a slide of the feeding device. The slide has a recess for receiving a single pin from a feed channel, and it delivers that pin to an outlet duct, where air flow transports it to the electrode holder.

A pneumatic circuit and an electric circuit can be provided for synchronizing the operation of the holder control unit and feed control unit. This can be such that when the driver cylinder of the fusion welding machine returns to its upper, rest position, this closes a proximity switch that activates the horizontal cylinder. This moves the movable head across, so that the electrode holder is ready to receive a pin. Simultaneously, the movable head closes another proximity switch that causes operation of the feed control unit and feeding device. The feeding device then delivers a pin to the electrode holder. After a predetermined time, the air supply to the feeding device and the horizontal cylinder are cut off, so that the movable head and the slide of the feeding device return to their rest positions. The timer controlling this time is such that it only operates when the first proximity switch, actuated by the driver cylinder, reaches its upper rest position. As the movable head retracts, the clamping means clamps the pin delivered in the electrode.

The fusion welding machine is then ready for a welding operation. When the operator depresses the foot pedal, the pin in the electrode holder is driven down into contact with the base piece. The charge stored in the capacitors is then discharged, forming the weld. When the electrode holder and piston of the driver cylinder travel back upwards to the rest position, the first proximity switch is closed, to recommence the cycle again.

Accordingly, for all work pieces, such as posts or pins for earrings and the like, the operator simply has to supply each base piece onto the table of the machine. When the foot pedal is operated, the pin is welded to the base piece, and when the electrode holder returns to its rest position, the automatic feed apparatus cycles to provide another pin ready for the next welding operation. Accordingly, it is expected that a high rate of welding can be simply maintained.

BRIEF DESCRIPTION OF THE DRAWINGS

For a better understanding of the present invention and to show more clearly how it may be carried into effect, reference will now be made, by way of example, to the accompanying drawings, in which.

DESCRIPTION OF THE PREFERRED EMBODIMENTS

Figure 1:
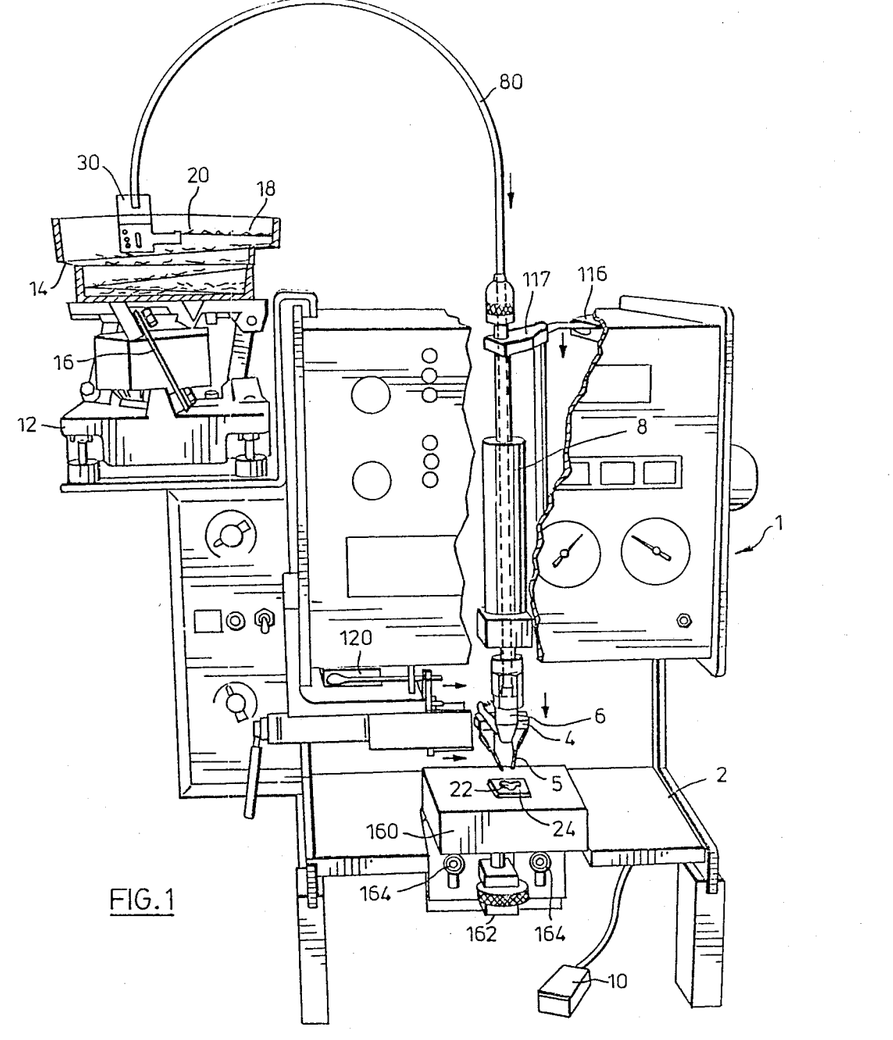
FIG. 1 is a perspective view of a fusion welding machine, incorporating an automatic feed apparatus in accordance with the present invention.

Referring first to FIG. 1, there is shown a fusion welding machine, denoted by the reference 1. Fusion welding machine 1 can be generally of known design, and could be for example an EFD 2200 fusion welder, manufactured by Electron Fusion Welding Devices Inc. of Rhode Island, U.S.A.

The fusion welding machine 1 would have a table 2 for a workpiece. A clamp 4 operated by a clamp cylinder (not shown) is provided above the table 2. The clamp 4 has clamp feet 5 which comprise electrodes of copper or the like. An electrode holder 6 is mounted at the bottom of the piston rod of a driver cylinder 8. A foot pedal 10 is provided for operation of the machine 1.

The welding machine 1 would also include a variety of other controls, such as capacitor selectors, voltage control, clamp pressure control etc. These can be standard, and since they form no direct part of the present invention, they will not be described in further detail here.

A vibratory feeder 12 is provided mounted to one side and near the top of the machine 1. The vibratory feeder 12 can be of known construction. The feeder 12 includes a bowl 14, mounted on springs 16. The bowl 14 includes a helical path, indicated schematically at 18. The bowl 14 is subjected to a rotary vibratory action. This causes pins 20 to climb the helical path 18. A feeding device 30 is provided at the upper end of the helical path 18.

Figure 3:
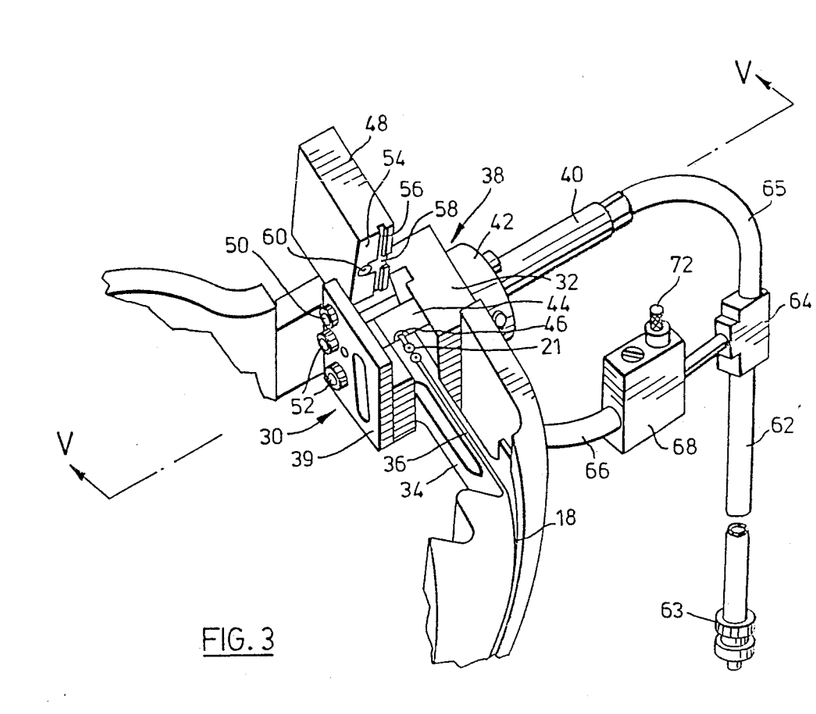
FIG. 3 is a perspective view from above of a feed device of the automatic feed apparatus.
Figure 4:
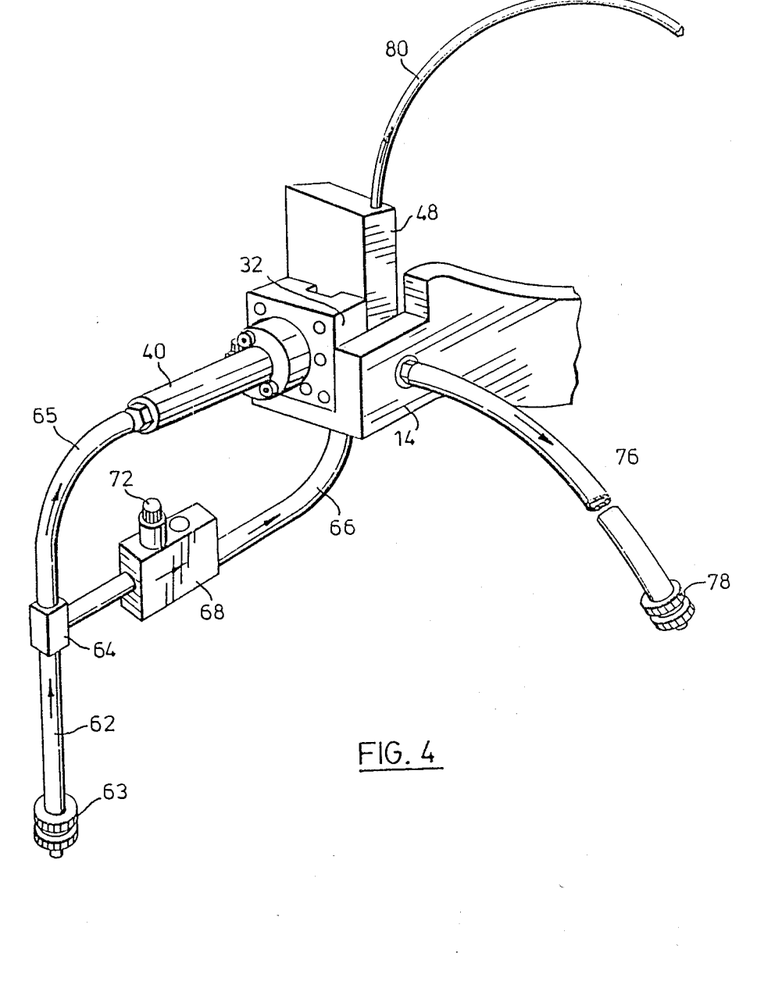
FIG. 4 is a perspective view from one side of the feed device of FIG. 3.
Figure 5:
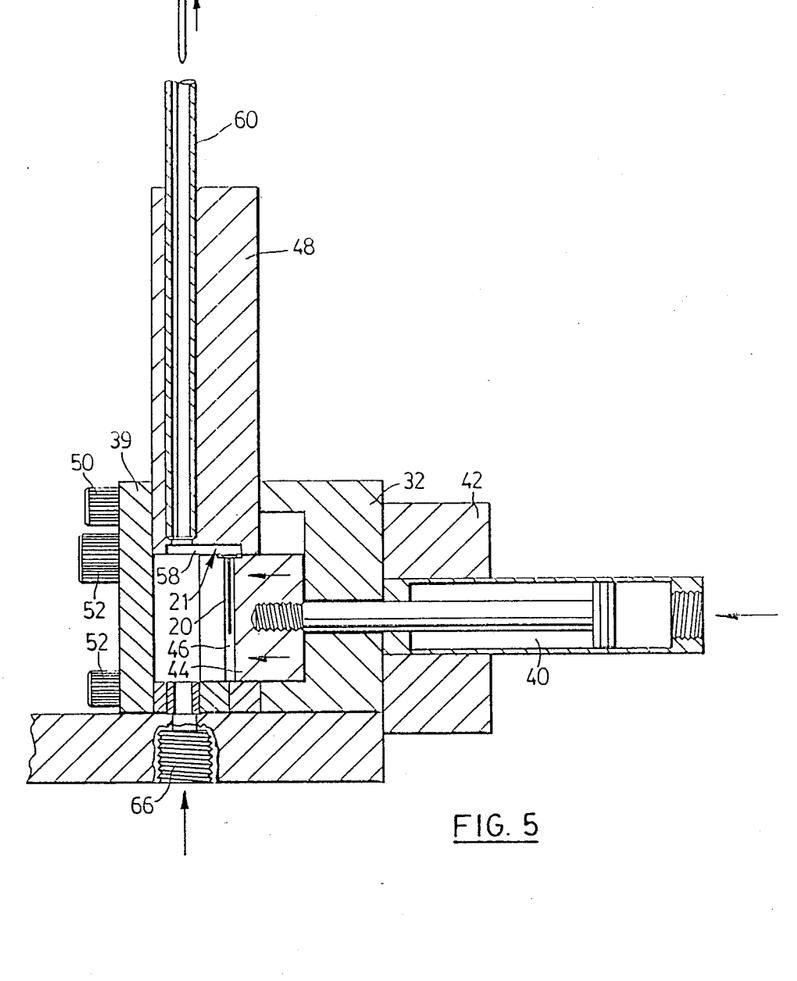
FIG. 5 is a vertical sectional view along line V—V of FIG. 3.

The feeding device 30 is shown in greater detail in FIGS. 3, 4 and 5. The feeding device 30 has a body 32.

The body 32 is connected to an input channel member 34, which defines a channel 36. The channel 36 is continuous with the helical path 18. The pins 20 have heads 21. Consequently, as the pins 20 travel off the end of the path 18 into the channel 36, the bodies of the pins 20 drop downwards with their heads 21 above the channel 36; the width of the channel 36 is less than the diameter of the heads 21.

The body 32 has back and front plates 38, 39. An injection piston and cylinder assembly 40 is mounted by a flange 42 to the back plate 38. A slide 44 is mounted for sliding movement across the end of the channel member 34. The slide 44 is guided by the body 32 and is connected to the piston of the piston and cylinder assembly 40. The slide 44 includes a vertical recess 46, which as shown in FIG. 5, is shaped to receive the pin heads 21. In the position shown in FIG. 3, the recess 46 is aligned with the channel 36, to enable a pin 20 at the end of the channel 36 to enter the recess 46.

An upper outlet member 48 is pivotally mounted between the plates 38, 39, by means of a screw 50. Corresponding screws 52 hold the components of the body 32 together. The upper outlet member 48 has a bottom surface 54, in which is formed a longitudinal groove 56. The groove 56 is aligned with the channel 36, to receive the pin heads 21, to enable the pins 20 to travel freely down the channel 36. A short transverse groove 58 extends across the longitudinal groove 56, and part way across the bottom face 54.

Within the upper outlet member 48, there is an outlet duct 60, which extends from the end of the transverse groove 58.

Figure 6:
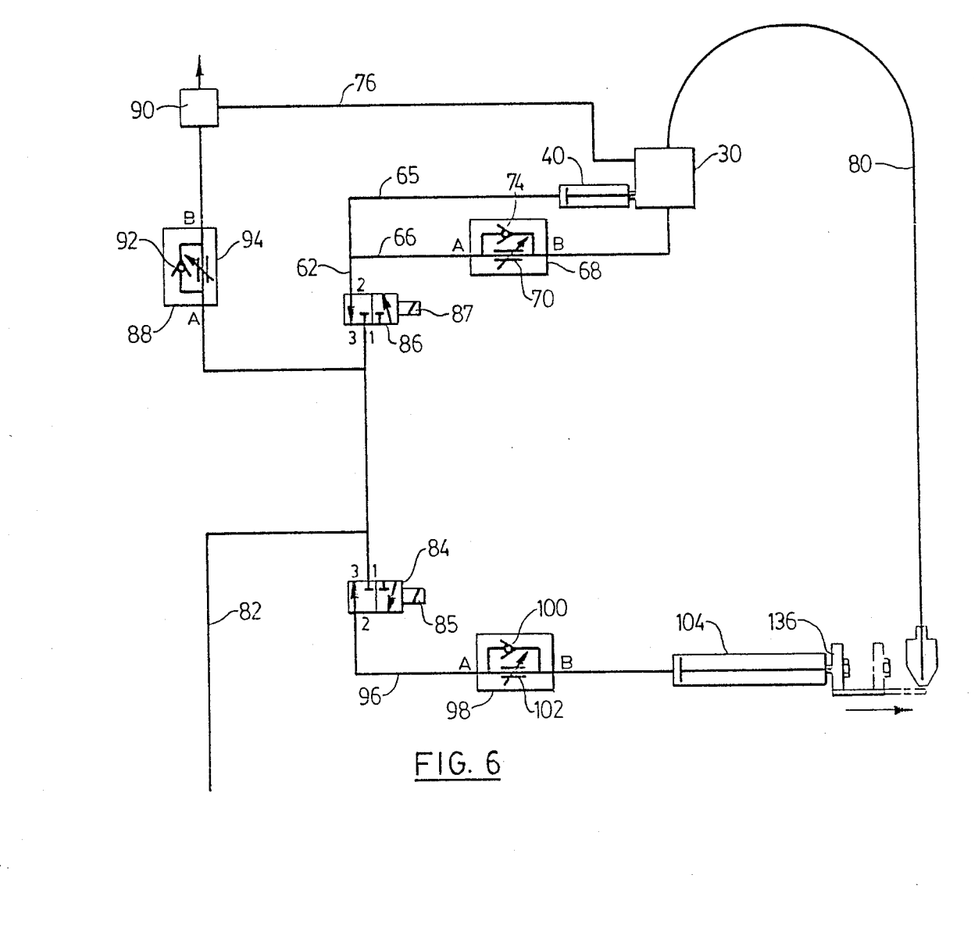
FIG. 6 is a schematic of a pneumatic circuit of the automatic feed apparatus.

An air supply conduit 62 has a connector 63, and is connected to a T connection piece 64. The connection piece 64 is in turn connected to a first branch conduit 65 and a second branch conduit 66. The first branch conduit 65 is connected directly to the cylinder of the actuating piston and cylinder assembly 40. In the second branch conduit 66, there is a flow control valve assembly 68. As shown in FIG. 6, the flow control valve assembly 68 includes a variable flow rate valve 70 and a non-return valve 74. The variable flow rate valve 70 includes an adjustment knob 72.

As shown in FIG. 4, a vacuum line 76, with a respective connector 78, is connected at its other end to the body 32 through the bowl 14. The vacuum line 76 is connected to the channel 36 to draw air therefrom, and consequently to draw the pins 20 along the channel 36.

A flexible delivery tube 80 is connected to the outlet duct 60.

Referring to FIG. 6, there is shown the overall pneumatic circuit including the components shown in FIGS. 3, 4 and 5. An air supply duct 82 is connected to first and second solenoid valves 84, 86. The air supply duct 82 is additionally connected to a vacuum regulator flow control 88, which in turn is connected to a vacuum generator 90.

The vacuum generator 90 relies on the Venturi principal. Compressed air from the supply duct 82 passes across the top of a tube, drawing air out of it. This other tube is connected to the vacuum line 76, thereby creating a sub-atmospheric pressure, or vacuum, in it. The vacuum regulator flow control comprises a non-return valve 92 and a variable flow rate valve 94. By adjusting the setting of the valve 94, the velocity of the compressed air through the generator 90 is varied, thereby varying the vacuum in the line 76.

The second solenoid valve 86 is a two position valve, as shown. It is additionally connected to the air supply conduit 62. It is spring-biased to the position shown, in which the air supply conduit 62 is closed off from the air supply duct 82. The second solenoid valve 86 includes a respective second solenoid 87, and when this is actuated, it is switched to the second position.

The first solenoid valve 84 has a corresponding first solenoid 85, and again is shown in a position that it adopts under the action of a spring. The solenoid 85 is actuated to switch it to the second position. The first solenoid valve 84 is connected to a control conduit 96. The control conduit 96 includes a flow regulator 98, which again includes a non-return valve 100 and a variable flow rate valve 102. The control conduit 96 is connected to a main, horizontal actuation cylinder 104.

Figure 7:
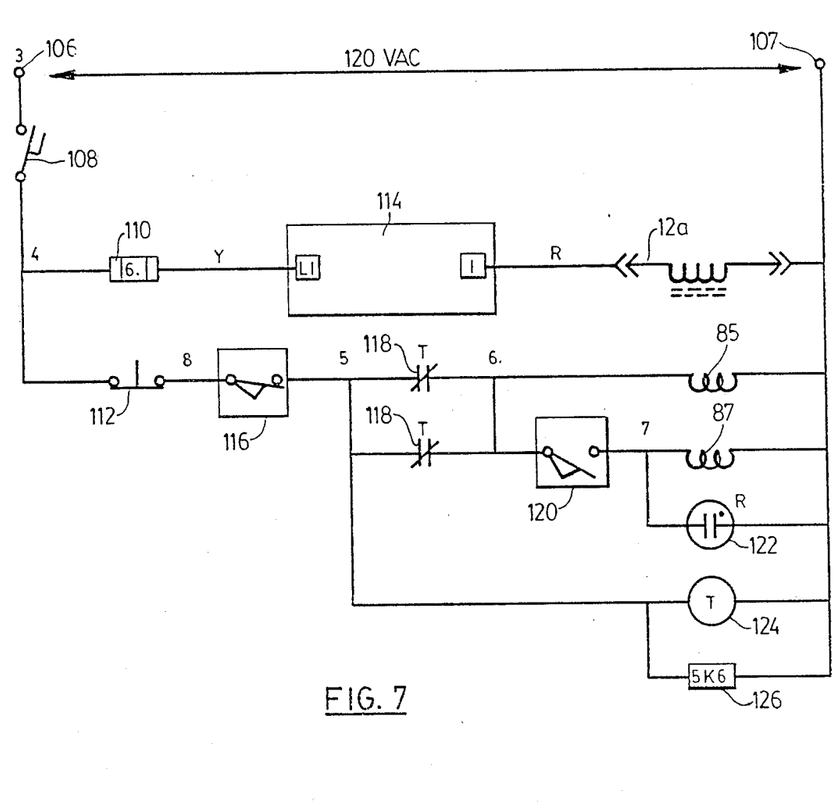
FIG. 7 is a schematic of an electric circuit of the automatic feed apparatus.

Turning to FIG. 7, which shows details of the electric circuit, the electric circuit has inputs 106, 107 for a 120 volt AC power supply. The input 106 is connected through a main switch 108 to a fuse 110 and a single cycle pushbutton 112. A line from the fuse 110 is connected through a vibrator control unit 114 and through the vibratory feeder, indicated schematically at 12a, to the other input 107. The main switch 108 is also connected to a single cycle pushbutton 112. The pushbutton 112 is connected to a first proximity switch 116. The first proximity switch 116 is connected to Normally Closed (NC) Contacts 118 of a timer 124. The timer 124 additionally includes a coil shown at T and connected in parallel. The contacts 118 of the timer 124 are connected to the first solenoid 85 and to a second proximity switch 120. The output of the second proximity switch 120 is connected to the second solenoid 87 and to an indicator lamp 122. As shown, the output of the first proximity switch 116 is also connected to the coil of the timer 124 and to an optional resistor 126 that is provided only to ensure that the appropriate load passes through the first proximity switch 116.

The other input 107 is also connected to the solenoids 85, 87 and the various devices 122, 124, 126.

As shown in FIG. 1, the first proximity switch 116 is mounted near the top of the fusion welding machine 1. It is actuated by a projecting lever 117 mounted on the piston of the drive cylinder 8.

Figure 2:
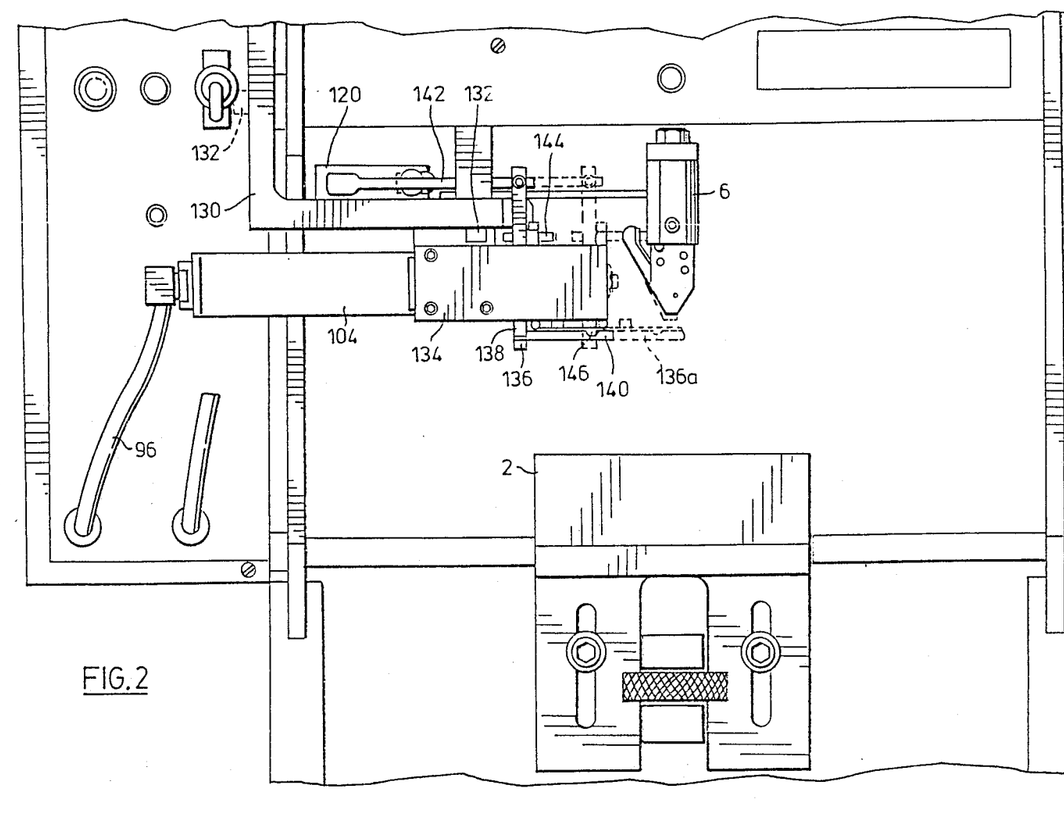
FIG. 2 is a front view of a part of the machine and apparatus of FIG. 1, showing the electrode holder.

Reference will now be made to FIG. 2, which shows a detail of the overall machine and apparatus shown in FIG. 1. A bracket 130 is generally L-shape and is secured by screws 132, with appropriate spacers, to the upper body of the fusion welding machine 1. The main, horizontal actuation cylinder 104 is secured to the bracket 130, and connected to the control conduit 96. As shown, vertical plates 134 extend forwardly from the cylinder 104 as side arms. The second proximity switch 120 is mounted on the bracket 130.

A movable head 136 is secured to the piston of the actuation cylinder 104. The head 136 includes a vertical plate 138 and a horizontal plate 140 (shown in FIGS. 9 and 10). The vertical plate 138 is shaped to engage slidably the plates or side arms 134. An actuation member 142 extends back from the vertical plate 138, for actuating the second proximity switch 120. In FIG. 2, the solid lines indicate a rest position of the movable head 136. When the actuation cylinder 104 is actuated, the head 136 is driven to the right as indicated by the dotted outline. The right hand position is indicated by use of the suffix "a".

The vertical plate 138 carries an adjustable abutment 144.

Figure 9:
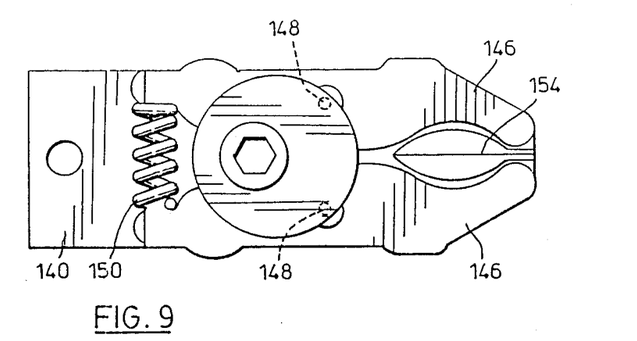
FIG. 9 is a plan view of a movable head of the automatic feed apparatus.
Figure 10:
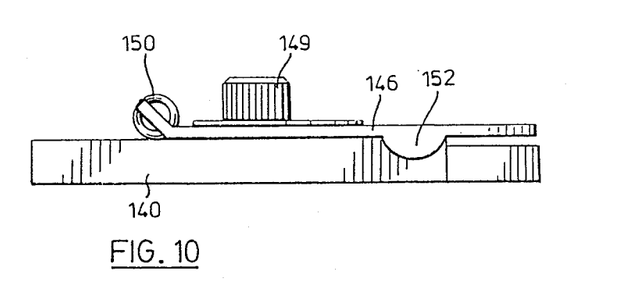
FIG. 10 is a side view of the movable head of FIG. 9.

Referring to FIGS. 9 and 10, on the horizontal plate 140, there are two guide levers 146. Each guide lever 146 is pivotally mounted at its middle, as indicated at 148. A compression spring 150 acts between rear extensions of the guide levers 146, to urge their forward ends together. A fastener and washer assembly 149 holds the guide levers 146 in position on the horizontal plate 140. The guide levers 146 include stops 152, to limit their motion under the action of the spring 150. As shown, the front of the horizontal plate 140 is tapered, and includes a depression 154, to receive a pin head 21.

The injection piston and cylinder assembly 40 provides a feed control unit, controlling operation of the feed device. Similarly, the movable head 136 and horizontal cylinder 104 provide a holder control unit, controlling operation of the electrode holder 6. It is also to be appreciated that both the piston and cylinder assembly 40 and horizontal cylinder 104 each include a spring to return the respective piston to a rest position.

The table 2 of the machine 1 includes a movable table 160. This can be adjusted vertically by means of a knurled wheel 162, which engages a threaded shaft secured to the table 160. When the table 160 has been adjusted to a desired position, then locking bolts 164 or the like are tightened, to lock it in position. The table 2 can include a fixture 24 for a base piece 22 that is to be welded to a pin 20. The fixture 24 would be shaped to receive and hold the base piece 22.

Figure 8:
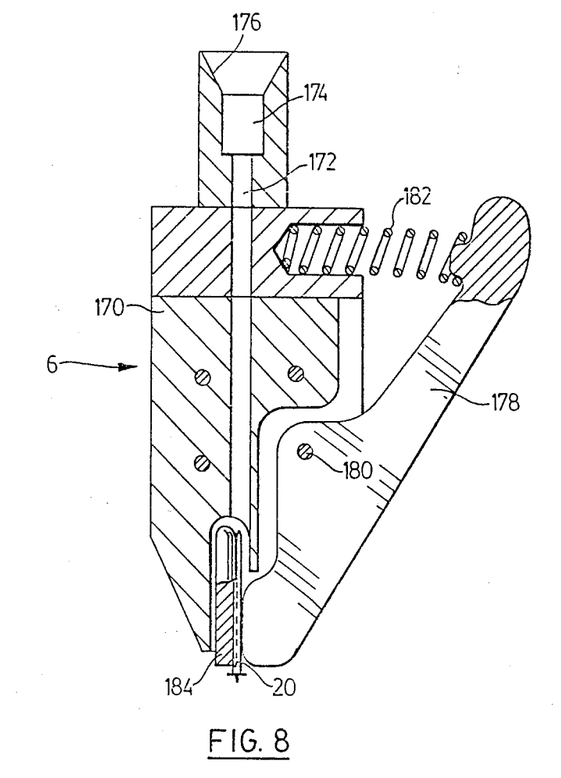
FIG. 8 is a front view of an electrode holder of the automatic feed apparatus.

The electrode holder 6 is shown in detail in FIG. 8, on an enlarged scale. The electrode holder 6 comprises a body 170 which defines a bore 172. The bore 172 has an enlarged upper end portion 174, for receiving an end of the delivery duct 80, and this is tapered at 176 to facilitate its insertion. The bore 172 has a diameter which is less than the diameter of each pin 20 plus the diameter of its head 21, to prevent a pair of pins 20 becoming jammed in the bore 172. Further, the body 170 is formed in two halves about a plane parallel to that of FIG. 8. The bore 172 is primarily formed in one half of the body, with only a small part of the bore being formed in the other half. This also helps ensure smooth passage of the pins 20 through the bore 172. A clamping lever 178 is pivotally mounted at 180, the clamping lever 178 is acted upon by a spring 182, that urges it clockwise, as viewed in FIG. 8. An electrode 184 is provided for contact with a pin 20, as shown in FIG. 8. The clamping lever then clamps the pin 20 to the electrode 184.

The operational sequence of the machine 1 will now be described. It is assumed that an appropriate electrical supply is connected to the inputs 106, 107, and the air supply duct 82 is connected to a source of compressed air. Simultaneously, the vibratory feed 12 is operated.

Consequently, the pins 20 are driven along the helical path 18 into the channel 36. The vacuum generator 90 maintains a vacuum drawing the pins along the channel 36, into the recess 46.

For each pin 20, a base piece 22 is provided. Prior to operation, a base piece 22 is placed on the movable table 160. If desired, the base piece 22 could be placed on a suitable fixture 24, shaped to receive and support the base piece 22. For example, the base piece 22 may have downwardly extending legs, and in this case the fixture 24 would have corresponding openings to receive it. The fixture 24 then ensures that the base piece 22 is properly located. The feet 5 of the clamp 4 are adjusted to contact the base piece 22, in known manner.

As the operation is cyclic, description of the cycle commences at the point where the piston of the driver cylinder 8 has risen to its upper vertical rest position.

At this point, the actuating lever 117 actuates the first proximity switch 116, closing it. The timer 118 is turned on and current is supplied to the first solenoid 85 (FIG. 2). The solenoid 85 then actuates the first solenoid valve 84, resulting in compressed air being supplied to the control conduit 96. The compressed air then flows through the flow regulator 98 to the horizontal cylinder 104.

The horizontal cylinder 104 drives the moveable head 136 to the right, so that the horizontal plate 140 is beneath the electrode holder 6. As the movable head 136 reaches its extreme right hand position, which is indicated by the dotted lines 136a in FIG. 2, its adjustable abutment 144 contacts the clamping lever 178 of the electrode holder 6. It pivots the lever 178, to open the electrode holder 6.

As the movable head 136 reaches the position 136a, the actuation member 142 contacts and operates the second proximity switch 120, closing it.

Consequently, current is supplied to the second solenoid 87. The length of time that the current is supplied depends upon the timer 124.

The second solenoid 87 then operates the second solenoid valve 86, causing compressed air to flow into the air supply conduit 62. This operates the piston and cylinder assembly 40. This assembly 40 drives the slide 44 across, carrying a pin 20 in the recess 46 with it. At the end of its travel, the recess 46 is beneath the outlet duct 60.

The compressed air supplied to the air supply conduit 62 also flows through the second branch conduit 66 and the flow control valve assembly 68 to the outlet duct 60. Consequently, this air flow drives the pin 20 out of the recess 46 and up through the outlet duct 60 into the delivery duct 80. The flow rate at the control valve assembly 68 is set, so that the pin 20 is carried through the duct 80 at a reasonable speed, which is neither too excessive nor so low that the pin 20 may not reach the uppermost part of the duct 80.

The timer 124 is set, to give the pin 20 sufficient time to travel down to the electrode holder 6, and is set for 0.4 seconds for example.

When the pin 20 reaches the electrode holder 6, its travel through the duct 80 has turned it over, so that its head 21 is now lowermost (FIG. 8). The head 21 is received by the depression 154.

The timer 124 then opens, cutting power to the first and second solenoids 85, 87. The timer 124 remains energized. This enables the solenoid valves 84, 86 to return to their rest positions shown in FIG. 6. The horizontal cylinder 104 returns to the left. As it travels to the left, the guide levers 146 ensure that the pin 20 is straight in the electrode holder 6. Further, as it travels to the left, the abutment 144 releases the clamping lever 178 of the electrode holder 6, thereby enabling the lever to grip the pin 20.

Simultaneously, the air supply to the feeding device 30 is cut off. The injection cylinder 40 and the slide 44 return to their rest position, in which the recess 46 is ready to receive another pin 20 from the channel 36.

The machine 1 is then ready for a welding operation. The operator depresses the foot pedal 10, which operates the machine in known manner. The clamp 4 decends, and the clamp feet 5 contact the base piece 22. Shortly thereafter, the drive cylinder 8 drives the electrode holder 6 down to the base piece 22. The charge stored in the capacitors of the machine 1 is then discharged through the point contact between the pin 20 and base piece 22, effecting the weld.

When the electrode holder 6 travelled downwards, it opened the first proximity switch 116, discharging the timer. When the foot pedal 10 is released, the piston of the drive cylinder 8 travels upwards. This closes the first proximity switch 116, to recommence the cycle.

Figure 11:
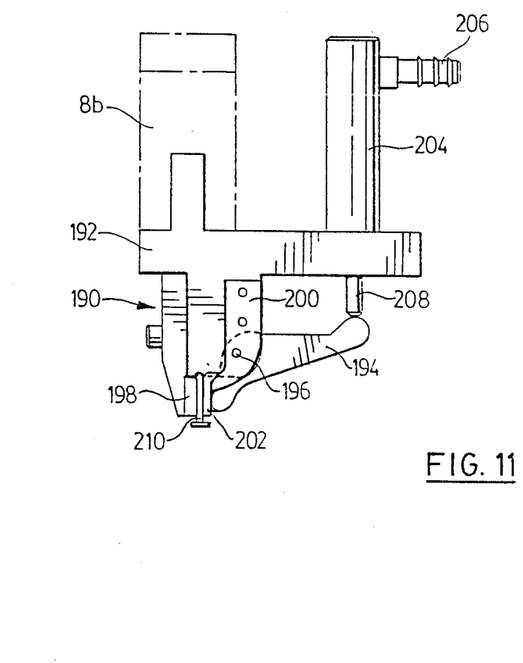
FIG. 11 is a front view of a second embodiment of an electrode holder in accordance with the present invention.

Reference will now be made to FIG. 11, which shows a variant electrode holder in accordance with the present invention. This electrode holder is designated by the reference 190. The electrode holder 190 has a body 192, adapted for mounting on a piston of a driver cylinder shown at 8b. A clamping lever 194 is pivotally mounted at 196 to the body 192. Also mounted on the body 192 is a first electrode 198, which is seen in side view. It consists of a flat, vertical part, and parallel, vertical side edges, which are of low height and extend towards the lever 194. A second electrode 200 includes a resilient arm 202, positioned adjacent one end of the lever 194.

A clamping cylinder 204 is mounted on the body 192. This is supplied with air at an inlet 206, and includes a piston 208 that acts on the other end of the lever 194.

In use, a finding, indicated at 210 is inserted between the electrodes 198, 200. This finding 210 could be a pivot bracket for the back of a badge. Compressed air is then supplied to the cylinder 204, causing the lever 194 to clamp the finding 210 between the electrodes 198, 200. This both simultaneously secures the finding and ensures that there is good electrical contact with it. It is to be noted that the lever 194 is arranged such that the lever arm between the pivot point 196 and the piston 208 is approximately twice that from the pivot 196 to the resilient arm 202.

The drive cylinder 8b then is operated to drive the finding 210 down onto the base piece (not shown), to fusion weld the two pieces together.

The electrode holder 190 is then raised, and the lever 194 released, so that a fresh finding 210 can be inserted.

We claim:

1. An automatic feed apparatus, for a fusion welding machine, the automatic feed apparatus comprising:
   an electrode holder, adapted for mounting on a driver cylinder of a fusion welding machine for holding a pin for fusion welding to a base piece, the electrode holder including a clamping means for clamping a pin;
   a holder control unit, which is mounted for opening the clamping means of the electrode holder;
   a feeding device for feeding pins to the electrode holder; and
   a feed control unit, which is connected to the feeding device and to the holder control unit, operation of the holder control unit and feed control unit being synchronized, so that the feed control unit only actuates the feeding device to feed a pin to the electrode holder when the holder control unit has opened the electrode holder, and after a predetermined time, the feed control unit terminates actuation of the feeding device and the holder control unit releases the clamping means, thereby clamping a pin.

2. An automatic feed apparatus as claimed in claim 1, in which the clamping means of the electrode holder comprises a clamping member and a spring biasing the clamping member into a closed position clamping a pin, the holder control unit being mounted for abutting and displacing the clamping member against the action of the spring to open the clamping means.

3. An automatic feed apparatus as claimed in claim 2, wherein the holder control unit includes a movable head, mounted for movement in a horizontal plane adjacent the electrode holder.

4. An automatic feed apparatus as claimed in claim 3, wherein the holder control unit includes a horizontal, pneumatic actuation cylinder, with the movable head mounted on a piston of the cylinder.

5. An automatic feed apparatus as claimed in claim 4, which includes a delivery duct connecting the feeding device to the electrode holder for delivering pins to the electrode holder, and wherein the feeding device includes a channel along which pins are delivered, a slide mounted for transverse movement across the end of the channel and including a recess for receiving a single pin, an outlet duct in communication with the delivery duct and arranged for receiving a supply of compressed air, and an injection cylinder assembly having a piston connected to the slide, for displacing the recess of the slide from the end of the channel to beneath the outlet duct, for delivery of a pin through the outlet and delivery ducts to the electrode holder.

6. An automatic feed apparatus as claimed in claim 5, which includes a first solenoid valve having a first solenoid for controlling supply of compressed air to the horizontal cylinder, and a second solenoid valve having a second solenoid for controlling supply of compressed air to the injection cylinder assembly, the first and second solenoid valves being normally closed and opening in response to actuation by their respective solenoids.

7. An automatic feed apparatus as claimed in claim 6, which includes a first proximity switch, for actuation by a driver cylinder of a fusion welding machine, which first switch is connected to the first solenoid and in use is closed when the piston of a driver cylinder reaches an upper position, and a second proximity switch which is arranged for actuation by the movable head and is connected to the second solenoid, the second switch being closed when the movable head is displaced to a position opening the clamping means, thereby opening the second solenoid valve so that compressed air is delivered to the feeding device.

8. An automatic feed apparatus as claimed in claim 7, which includes an actuating lever for mounting on the piston of a driver cylinder of a fusion welding machine for actuating the first proximity switch, and an actuation member mounted on the movable head, for actuating the second proximity switch.

9. An automatic feed apparatus as claimed in claim 7, which includes first and second inputs and a timer which has contacts that are normally closed, and wherein the first proximity switch is connected between the first input and a contact of the timer, and another contact of the timer is connected to the first solenoid and parallel thereto the second proximity switch and the second solenoid in series, with the first and second solenoids additionally connected to the second input, the timer's contacts being closed for said predetermined time when the first proximity switch closes and the timer's contacts open at the end of that time.

10. An automatic feed apparatus as claimed in claim 9, which includes a signal light connected between the first and second inputs and in series with the timer's contacts.

11. An automatic feed apparatus as claimed in claim 9, wherein the second solenoid valve is connected to a first branch conduit that is connected to the injection cylinder assembly and a second branch conduit, which includes a flow control valve assembly and which opens beneath the outlet duct to supply air at a controlled rate to the outlet and delivery ducts.

12. An automatic feed apparatus as claimed in claim 11, wherein the first solenoid valve is connected to the first, horizontal cylinder via a flow regulator.

13. An automatic feed apparatus as claimed in claim 11 or 12, which includes an air supply duct for connection to a source of compressed air, which air supply duct is connected to the first and second solenoid valves, and which apparatus includes a vacuum generator, which is connected to the air supply duct via a vacuum regulator flow control, which regulates the supply of compressed air to the vacuum generator and thereby the sub-atmospheric pressure generated, the vacuum generator being connected to the feeding device for drawing pins to he slide.

14. An automatic feed apparatus as claimed in claim 9, wherein the electrode holder comprises a body having a bore in communication with the delivery duct and an electrode adjacent a lower end of the bore, and wherein the clamping member comprises a clamping lever pivotally mounted to the body and having one end which is arranged for abutment with the holder control unit and is acted upon by said spring and another end arranged adjacent the electrode for clamping a pin to the electrode.

15. An automatic feed apparatus as claimed in claim 14, wherein the diameter of the bore is less than the sum of the diameters of a pin and the head of a pin.

16. An automatic feed apparatus as claimed in claim 15, wherein the delivery duct comprises an elongate flexible tube that extends from the feeding device to the electrode holder, and is adapted to extend through the piston of a drive cylinder of a fusion welding machine.

17. An automatic feed apparatus as claimed in claim 9, wherein the movable head includes a horizontal plate, which extends beneath the electrode holder when the holder control unit is actuated, and which includes two levers pivotally mounted on a top surface thereof and biased by resilient biasing means towards one another, for guiding a pin.

18. An automatic feed apparatus as claimed in claim 17, wherein the horizontal plate includes a depression for receiving the head of a pin, first ends of the levers are located on either side of the depression, the levers are pivotally mounted to the horizontal plate and a compression spring acting on other ends of the levers urges the first ends of the levers towards one another, to guide a head of a pin as the movable head is retracted.

19. An electrode holder comprising a body, an upper end of which is adapted for mounting to the piston of a drive cylinder of a fusion welding machine, a first electrode located at a lower end of the body, a second electrode mounted adjacent the first electrode and including a resilient part, a clamping lever pivotally mounted to the body and having one end located adjacent the second electrode on a side remote from the first electrode and another end, and an actuating cylinder mounted to the body and having a piston acting on the other end of the clamping lever, for rotating the clamping lever so that its one end displaces the resilient part of the second electrode towards the first electrode to clamp a finding between the first and second electrodes.

20. An electrode holder as claimed in claim 19, wherein the distance between the pivot location of the clamping lever and said other end thereof is approximately twice the distance from the pivot location to said one end thereof.

* * * * *